US006498937B1

(12) United States Patent
Smith

(10) Patent No.: US 6,498,937 B1
(45) Date of Patent: Dec. 24, 2002

(54) ASYMMETRIC BANDWIDTH WIRELESS COMMUNICATION TECHNIQUES

(75) Inventor: Ronald P. Smith, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 121 days.

(21) Appl. No.: 09/616,584

(22) Filed: Jul. 14, 2000

(51) Int. Cl.[7] .............................. H04B 7/00; H04Q 7/20
(52) U.S. Cl. ...................... 455/522; 455/13.4; 455/13.2; 455/572; 455/428; 370/315; 370/316; 370/395; 370/396; 370/397; 375/297; 375/305; 375/308
(58) Field of Search .............................. 455/522, 11.1, 455/127, 12.1, 13.1, 13.4, 13.2, 572, 427, 428; 370/315, 316, 319, 396, 397, 389, 395, 318; 375/297, 305, 308, 312

(56) References Cited

U.S. PATENT DOCUMENTS

| | | |
|---|---|---|
| 3,982,620 A | 9/1976 | Kotenhaus |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,412,292 A | 10/1983 | Sedam |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,582,324 A | 4/1986 | Koza |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin |
| 4,675,538 A | 6/1987 | Epstein |
| 4,677,311 A | 6/1987 | Morita |
| 4,677,565 A | 6/1987 | Ogaki |

(List continued on next page.)

FOREIGN PATENT DOCUMENTS

| | | |
|---|---|---|
| AU | 199954012 | 4/2000 |
| DE | A 3820835 | 1/1989 |
| DE | 3820835 A1 | 1/1989 |
| DE | 4244198 | 6/1994 |
| DE | 19610739 | 9/1997 |
| EP | A0082077 | 6/1983 |
| EP | 0140593 A2 | 5/1985 |
| EP | 0256921 | 2/1988 |
| EP | 0283304 | 9/1988 |
| EP | A 0283350 | 9/1988 |

(List continued on next page.)

OTHER PUBLICATIONS

U.S. application Ser. No. 09/050,390, Reudink et al., filed Mar. 30, 1998.
Patent Abstract of Japan vol. 95, No. 010 & JP 07 281682 A (Naguo Yuasa), 27 Oct. 1 JP 07 281682, figure 1–6 abrége.

(List continued on next page.)

*Primary Examiner*—Lester G. Kincaid
*Assistant Examiner*—Marceau Milord
(74) *Attorney, Agent, or Firm*—McAndrews, Held & Malloy, Ltd.

(57) ABSTRACT

A wireless communication system operates a power amplifier (422) in an earth terminal (400) in a non-saturated mode of operation to transmit communication signals over a communication uplink to a communication satellite (100). The satellite operates a power amplifier (186, 188) in a saturated mode of operation to transmit communication signals over a communication downlink to terminal (400). Operating the amplifiers in the different modes of operation increases efficiency.

13 Claims, 3 Drawing Sheets

U.S. PATENT DOCUMENTS

| | | | |
|---|---|---|---|
| 4,703,465 A | 10/1987 | Parker | |
| 4,704,804 A | 11/1987 | Leal | |
| 4,722,053 A | 1/1988 | Dubno | |
| 4,761,684 A | 8/1988 | Clark | |
| 4,766,581 A | 8/1988 | Korn | |
| 4,787,050 A | 11/1988 | Suzuki | |
| 4,792,849 A | 12/1988 | McCalley | |
| 4,811,325 A | 3/1989 | Sharples | |
| 4,825,054 A | 4/1989 | Rust | |
| 4,868,832 A | 9/1989 | Marrington | |
| 4,896,369 A * | 1/1990 | Adams, Jr. et al. | 455/12 |
| 4,920,432 A | 4/1990 | Eggers | |
| 4,922,420 A | 5/1990 | Nakagawa | |
| 4,924,378 A | 5/1990 | Hershey | |
| 4,926,485 A | 5/1990 | Yamashita | |
| 4,937,807 A | 6/1990 | Weitz | |
| 4,949,187 A | 8/1990 | Cohen | |
| 4,956,768 A | 9/1990 | Sidi | |
| 4,958,835 A | 9/1990 | Tashiro | |
| 4,999,806 A | 3/1991 | Chernow | |
| 5,012,121 A | 4/1991 | Hammond | |
| 5,041,921 A | 8/1991 | Scheffler | |
| 5,058,089 A | 10/1991 | Yoshimara | |
| 5,138,712 A | 8/1992 | Corbin | |
| 5,155,847 A | 10/1992 | Kirouac | |
| 5,163,131 A | 11/1992 | Row | |
| 5,166,886 A | 11/1992 | Molnar | |
| 5,191,573 A | 3/1993 | Hair | |
| 5,191,611 A | 3/1993 | Lang | |
| 5,192,999 A | 3/1993 | Graczyk | |
| 5,197,094 A | 3/1993 | Tillery | |
| 5,203,028 A | 4/1993 | Shiraishi | |
| 5,237,157 A | 8/1993 | Kaplan | |
| 5,237,322 A | 8/1993 | Heberle | |
| 5,239,480 A | 8/1993 | Huegel | |
| 5,250,747 A | 10/1993 | Tsumura | |
| 5,260,999 A | 11/1993 | Wyman | |
| 5,262,875 A | 11/1993 | Mincer et al. | |
| 5,276,866 A | 1/1994 | Paolini | |
| 5,315,161 A | 5/1994 | Robinson | |
| 5,339,413 A | 8/1994 | Koval | |
| 5,341,350 A | 8/1994 | Frank | |
| 5,355,302 A | 10/1994 | Martin | |
| 5,357,276 A | 10/1994 | Banker | |
| 5,369,778 A | 11/1994 | SanSoucie | |
| 5,375,206 A | 12/1994 | Hunter | |
| 5,418,713 A | 5/1995 | Allen | |
| 5,420,923 A | 5/1995 | Beyers | |
| 5,428,252 A | 6/1995 | Walker | |
| 5,431,492 A | 7/1995 | Rothschild | |
| 5,445,295 A | 8/1995 | Brown | |
| 5,455,926 A | 10/1995 | Keele | |
| 5,457,305 A | 10/1995 | Akel | |
| 5,465,213 A | 11/1995 | Ross | |
| 5,475,835 A | 12/1995 | Hickey | |
| 5,481,509 A | 1/1996 | Knowles | |
| 5,495,610 A | 2/1996 | Shing | |
| 5,496,178 A | 3/1996 | Back | |
| 5,511,000 A | 4/1996 | Kaloi | |
| 5,513,117 A | 4/1996 | Small | |
| 5,548,729 A | 8/1996 | Akiyoshi | |
| 5,550,577 A | 8/1996 | Verbiest | |
| 5,555,244 A | 9/1996 | Gupta | |
| 5,557,541 A | 9/1996 | Schulhof | |
| 5,559,505 A | 9/1996 | McNair | |
| 5,559,549 A | 9/1996 | Hendricks | |
| 5,566,237 A | 10/1996 | Dobbs | |
| 5,583,994 A | 12/1996 | Rangan | |
| 5,592,551 A | 1/1997 | Lett | |
| 5,594,509 A | 1/1997 | Florin | |
| 5,612,581 A | 3/1997 | Kageyama | |
| 5,613,909 A | 3/1997 | Stelovsky | |
| 5,619,247 A | 4/1997 | Russo | |
| 5,619,698 A | 4/1997 | Lillich | |
| 5,623,666 A | 4/1997 | Pike | |
| 5,642,337 A | 6/1997 | Oskay | |
| 5,644,714 A | 7/1997 | Kikinis | |
| 5,644,766 A | 7/1997 | Coy | |
| 5,668,592 A | 9/1997 | Spaulding | |
| 5,668,788 A | 9/1997 | Allison | |
| 5,684,716 A | 11/1997 | Freeman | |
| 5,691,778 A | 11/1997 | Song | |
| 5,703,795 A | 12/1997 | Mankowitz | |
| 5,708,811 A | 1/1998 | Arendt | |
| 5,712,976 A | 1/1998 | Falcon | |
| 5,726,909 A | 3/1998 | Krikorian | |
| 5,734,719 A | 3/1998 | Tsevdos | |
| 5,734,961 A | 3/1998 | Castille | |
| 5,761,655 A | 6/1998 | Hoffman | |
| 5,762,552 A | 6/1998 | Vuong | |
| 5,774,668 A | 6/1998 | Choqiuer | |
| 5,774,672 A | 6/1998 | Funahashi | |
| 5,781,889 A | 7/1998 | Martin | |
| 5,790,172 A | 8/1998 | Imanaka | |
| 5,790,671 A | 8/1998 | Cooper | |
| 5,790,856 A | 8/1998 | Lillich | |
| 5,793,980 A | 8/1998 | Glaser | |
| 5,798,785 A | 8/1998 | Hendricks | |
| 5,802,599 A | 9/1998 | Cabrera | |
| 5,808,224 A | 9/1998 | Kato | |
| 5,809,246 A | 9/1998 | Goldman | |
| 5,832,287 A | 11/1998 | Atalla | |
| 5,835,843 A | 11/1998 | Haddad | |
| 5,845,104 A | 12/1998 | Rao | |
| 5,848,398 A | 12/1998 | Martin | |
| 5,854,887 A | 12/1998 | Kindell | |
| 5,862,324 A | 1/1999 | Collins | |
| 5,864,870 A | 1/1999 | Guck | |
| 5,867,714 A | 2/1999 | Todd | |
| 5,884,028 A | 3/1999 | Kindell | |
| 5,884,298 A | 3/1999 | Smith | |
| 5,887,193 A | 3/1999 | Takahashi | |
| 5,913,040 A | 6/1999 | Rakavy | |
| 5,915,094 A | 6/1999 | Kouloheris | |
| 5,915,238 A | 6/1999 | Tjaden | |
| 5,917,537 A | 6/1999 | Lightfoot | |
| 5,917,835 A | 6/1999 | Barrett | |
| 5,923,885 A | 7/1999 | Johnson | |
| 5,930,765 A | 7/1999 | Martin | |
| 5,931,908 A | 8/1999 | Gerba | |
| 5,949,688 A | 9/1999 | Montoya | |
| 5,959,869 A | 9/1999 | Miller | |
| 5,959,945 A | 9/1999 | Kleiman | |
| 5,966,495 A | 10/1999 | Takahashi | |
| 5,978,855 A | 11/1999 | Metz | |
| 6,002,720 A | 12/1999 | Yurt | |
| 6,009,274 A | 12/1999 | Fletcher | |
| 6,018,337 A | 1/2000 | Peters | |
| 6,032,041 A * | 2/2000 | Wainfan et al. | 455/427 |
| 6,072,982 A | 6/2000 | Haddad | |
| 6,141,534 A * | 10/2000 | Snell et al. | 455/12.1 |
| 6,147,981 A * | 11/2000 | Prescott | 370/318 |
| 6,151,634 A | 11/2000 | Glaser | |
| 6,212,360 B1 * | 4/2001 | Fleming, III et al. | 455/13.4 |
| 6,278,861 B1 * | 8/2001 | Ward et al. | 455/13.1 |
| 6,295,283 B1 * | 9/2001 | Falk | 370/325 |
| 6,298,242 B1 * | 10/2001 | Schiff | 455/522 |
| 6,335,920 B1 * | 1/2002 | Strodtbeck et al. | 370/318 |

FOREIGN PATENT DOCUMENTS

| | | |
|---|---|---|
| EP | 0309298 | 3/1989 |

| | | |
|---|---|---|
| EP | A 0313359 | 4/1989 |
| EP | 0340787 | 11/1989 |
| EP | 0363186 | 4/1990 |
| EP | 0 425 168 A | 5/1991 |
| EP | 0480558 | 4/1992 |
| EP | 0498130 | 8/1992 |
| EP | 0498130 A2 | 8/1992 |
| EP | 0 507 110 | 10/1992 |
| EP | 0538319 B1 | 4/1993 |
| EP | A 0631283 | 12/1994 |
| EP | 0632371 | 1/1995 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974896 A1 | 1/2000 |
| EP | 0982695 | 3/2000 |
| FR | A 2602352 | 2/1988 |
| GB | A 2122799 | 1/1984 |
| GB | 2166328 A | 4/1986 |
| GB | 2170943 | 8/1986 |
| GB | 2193420 | 2/1988 |
| GB | 2 238680 A | 6/1991 |
| GB | 2259398 | 3/1993 |
| GB | 2262170 A | 6/1993 |
| JP | 57-173207 | 10/1982 |
| JP | 58-179892 | 10/1983 |
| JP | 60-253082 | 12/1985 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 07281682 | 10/1995 |
| JP | 08-279235 | 10/1996 |
| JP | 10-098344 | 4/1998 |
| WO | WO 86 01326 A | 2/1986 |
| WO | WO A 90 07843 | 7/1990 |
| WO | WO 91/08542 | 6/1991 |
| WO | WO A 91 20082 | 12/1991 |
| WO | WO 93/16557 | 8/1993 |
| WO | WO A 93 18465 | 9/1993 |
| WO | WO A 94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 96/12255 | 4/1996 |
| WO | WO 96/12257 | 4/1996 |
| WO | WO 96 12258 A | 4/1996 |
| WO | WO 98/45835 | 10/1998 |

OTHER PUBLICATIONS

Bonczck, Robert H. et al, "The DSS Development System", 1983 National Computer Conference, Anaheim California, May 16–19, 1983, pp. 441–455.

IBM Technical Disclosure Bulletin, vol. 30, No. 5, Oct. 1987, "Method for Automated Assembly of Software Versions", pp. 353–355.

"Robotic Wafer Handling System for Class 10 Environments" IBM Technical Disclosure Bulletin, vol. 32, No. 9A, Feb. 1990, pp. 141–143.

"High–speed Opens and Shorts Substrate Tester", IBM Technical Disclosure Bulletin, vol. 33, No. 12, May 1991, pp. 251–259.

"Darts Revolution Again", Replay Magazine, Mar. 1991, pp. 146–148.

* cited by examiner

ASYMMETRIC BANDWIDTH WIRELESS COMMUNICATION TECHNIQUES

BACKGROUND OF THE INVENTION

This invention relates to wireless communication and more particularly relates to such communication over a link in which one of the transmitters used for communication has a power transmission disadvantage compared to another transmitter used for communication over the link.

Bandwidth for wireless communication systems is a limited resource. Methods for efficient use of bandwidth are needed for satellite communications and cellular telephone communications. This invention addresses the need and provides a solution.

BRIEF SUMMARY OF THE INVENTION

The preferred embodiment is useful in a wireless communication system employing a communication link between a first transmitter/receiver comprising a first power amplifier and a second transmitter/receiver comprising a second power amplifier. The second transmitter/receiver has a power transmitting disadvantage with respect to the first transmitter/receiver. In such an environment, the efficiency of the communication can be improved by generating first communication signals for transmission over the communication link from the first transmitter/receiver to the second transmitter/receiver. The first power amplifier is operated in a non-saturated mode of operation during transmission of the first communication signals to the second transmitter/receiver on the communication link. Second communication signals are generated for transmission over the communication link from the second transmitter/receiver to the first transmitter/receiver. The second power amplifier is operated in a saturated mode of operation during transmission of the second communication signals on the communication link to the first transmitter/receiver. The foregoing techniques can be used to advantage in wireless communication systems, such as a satellite communication system or a cellular telephone communication system.

By using the foregoing techniques in a satellite communication system, the satellite uplink requires less bandwidth than prior art symmetric systems. Bandwidth is a limited resource that is regulated internationally and often licensed for use at high cost. Thus, saving bandwidth on the uplink can:

1. reduce requirements for the limited bandwidth resource;
2. reduce cost;
3. allow allocation of more-bandwidth to downlink (by reducing uplink bandwidth), thereby allowing maximum data transmission from user terminal uplink to satellite and satellite downlink to user terminal; and
4. maximize possible revenue to satellite communication operators (billable bits) by using the foregoing techniques.

DETAILED DESCRIPTION OF THE PREFERRED EMBODIMENTS

Figure 1:
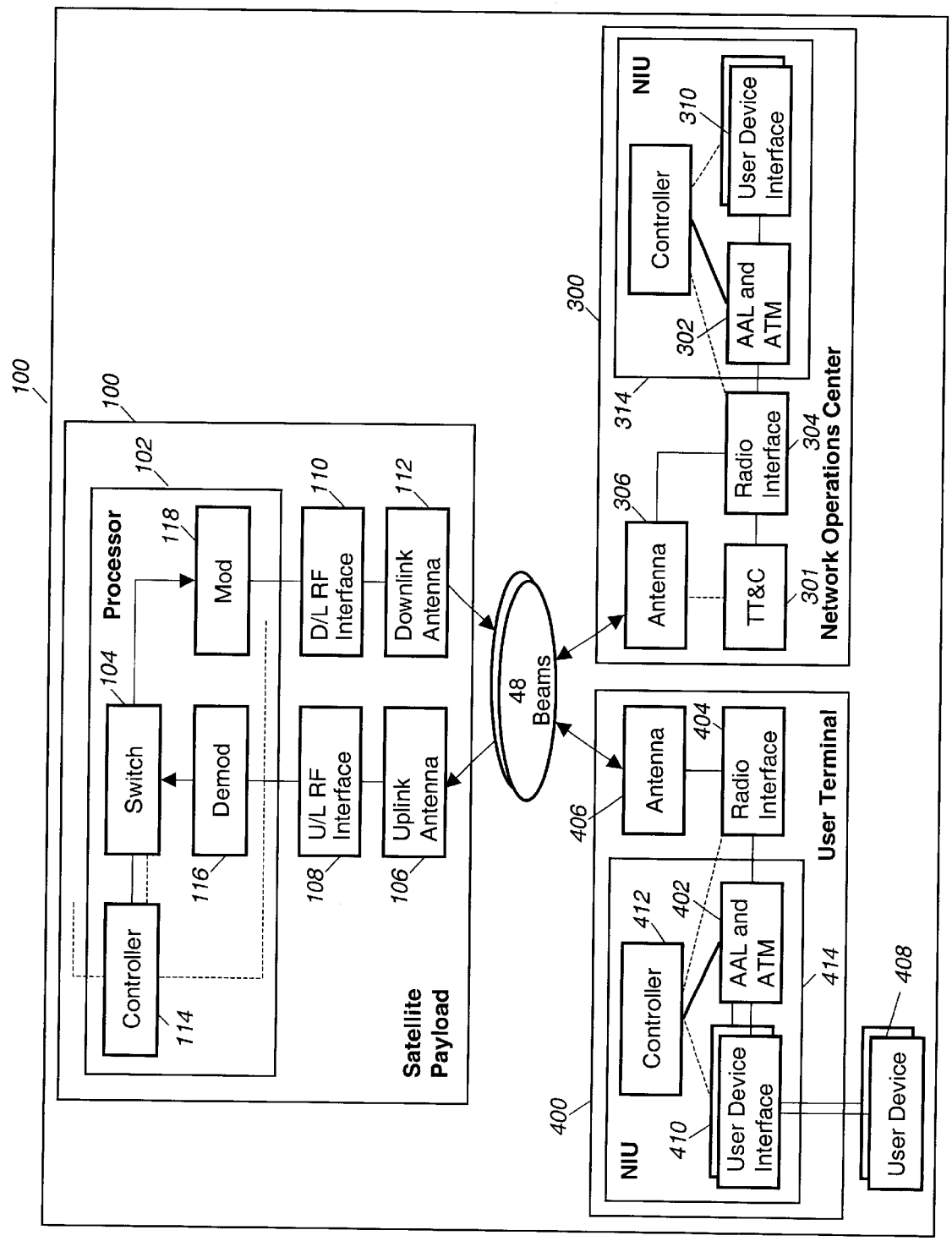
FIG. 1 is a schematic block diagram of a preferred form of satellite transmission and reception apparatus made in accordance with the invention.

Referring to FIG. 1, a preferred form of satellite communication system made in accordance with the invention includes one or more satellites, such as satellite 100, in geostationary orbit. Satellite 100 operates as a receiver/transmitter and contains a processor 102 that performs a cell switching function. The processor's controller 114 configures a cell switch 104 based on commands received from one or more ground-based Network Operations Center (NOCs) such as NOC 300. The NOC 300 provides ATM switch management functionality, including control of call admission and maintenance of signaling with one or more User Earth Terminals (UETs), such as receiver/transmitter UET 400, required to establish an ATM switched virtual circuit.

The payload of satellite 100 is controlled by NOC 300 which may control multiple satellites.

ATM cells transmit user data through the system, from source UET 400 to a destination UET (not shown but functionally identical to source UET 400). This is the primary system flow, starting from the AAL/ATM component 402 within the UET 400; flowing through the UET's RF interface 404 and antenna 406; through the satellite payload's uplink antenna 106 and RF interface 108; switched through the processor 102 through the payload's downlink RF interface 110 and antenna 112; and finally through the destination UET's antenna and RF interface to the destination UET's ATM/AAL component which may be a mobile or cellular telephone.

User data is transferred between the system and a user device 408 via the "External User Data" flow. This data flow, which is in a format unique to the user device, yet based on industry standards, is converted into a UET internal format (e.g., a PCI bus) by a user device interface 410 and transferred to the ATM/AAL component 402 where it is reformed into an ATM cell flow. In addition to the transfer of user data, ATM cells are used to transport signaling. This data flow includes the signaling of messages between the controllers located in the NOC 300, payload processor 102 and UET 400. ATM cells are used in this stream for two reasons. First, the satellite payload's controller can exchange messages with any UET and NOC by simply sending an ATM cell with the correct address to the cell switch 104. The controller-switch interface is then just like any other switch port. Second, the multiple access scheme in the UET and NOC must already address the insertion of ATM cells into the transmission subsystem to carry user data. Inserting signaling messages into this data stream is made simpler by using the same ATM cell format. C Control and management signals are provided internal to each component: the terminal controller unit 412 in the UET 400 must signal the RF interface 404 to tune to a particular frequency, for example. The payload controller 114 must collect traffic statistics from the demodulators; telemetry data is collected within the NOC's TT&C 301 and transferred to the satellite 100; the payload controller 114 must configure the switch 104 to route virtual circuits; timing and frequency signals must be passed to many payload components, etc.

UET 400 provides the capability to connect user devices to the network. The term "user device" refers to any communication equipment that conforms to industry standard interfaces, including PCs, telephones, set-top boxes, ATM switches, IP routers, UNIX workstations, etc.

User devices communicate with other user devices, attached to other UETs through the use of ATM switched virtual circuits (VCs). Individual VCs are established and maintained through signaling messages exchanged between NOC 300 and the UET 400. A single UET can support multiple VCs and user devices.

The user device 408 may or may not support the ATM protocols. For non-ATM user devices, the UET 400 encapsulates the user data stream in ATM cells for transmission across the network. The destination UET then recovers the user data stream which is passed to the destination user device.

User device 408 represents a variety of current consumer electronics devices, including personal computers, set-top boxes, interactive game players, and Web-TV devices. These devices interface with the Network Interface Unit (NIU) 414 via industry standard interfaces or "ports" including the RJ-11 telephone jack; PC buses such as EISA, PCI and SCSI; LAN networks such as Ethernet and IEEE 802.3; and video and audio ports.

The external interface components of the NIU 414 provides the mechanical and electrical interface to'the user device. Functionally, a unique line interface exists for 0each type of interface (RJ-11, PCI, 802.3). Physically, a single NIU may include several line interfaces. For example, an NIU may be packaged as a "plug-in" card for a PCI bus and provide RJ-11 and IEEE 802.3 line interfaces.

Component 402 within the NIU 414 is responsible for converting a stream of bits produced by the user device interface into ATM cells. In order to produce ATM cells, this component implements various ATM Adaption Layer (AAL) protocols. It is also responsible for inserting messages produced by the controller into the ATM "stream" and removing ATM cells received from the network destined for the controller.

The controller 412 provides network specific signaling functions. This includes subscriber registration, the establishment of connections between the UET 400 and the network and network management functions.

The radio interface 404 of the UET 400 provides forward error correction (FEC) coding and modulation for data being transmitted to the network and demodulation, de-interleaving and decoding for data received from the network. This includes the framing of ATM cells produced by the protocol adaptation component into multiple frequency TDMA channel slots on the uplink. The modulation takes the form of high order modulation, such as QAM or OFDM modulation.

The antenna 406 is responsible for radiating energy toward the satellite 100 and collecting energy from the satellite's downlink.

UET 400 can assume many different physical forms. To support a consumer grade terminal, a plug-in PC card may contain the NIU 414 and portions of the radio interface 404, with a cable connecting the card to an outdoor device housing the remainder of the radio interface 404 and the antenna 406.

To support an Internet Service Provider's gateway, UET 400 may consist of one or more 10baseT user device interface cards (each connected to a port on a router), a single board computer to serve as the controller 412, an AAL/ATM card 402 to provide ATM functions, and a separate card to provide the radio interface 404. These cards could all reside in VME chassis and be mounted in the same rack as the router and other ISP equipment.

In each of these examples, the architecture of the UET remains unchanged. Each contains an NIU 414 that interfaces with one or more user devices, a radio interface 404 and an antenna 406. This same architectural philosophy is extended to the network operations center 300. The NOC 300 also contains an NIU 314 where the very same functions present in the NIU 414 are performed. The corresponding devices in NOC 300 bear the same numbers as in UET 400, except that they are in the 300 series, rather than the 400 series.

The central role of the satellite 100 payload is to switch ATM cells from source to destination. In order to switch ATM cells, uplink bursts bearing the cells must be recovered (demodulated and decoded), partitioned into cells, and routed through the switch 104. These functions constitute a "processed payload" in common industry parlance and are provided by the processor 102 in the system architecture.

The processor contains the following components:

A demodulator 116 provides an A/D converter, channelizer and demodulator for each band. The demodulator supports two coding rates: a light code for normal service and a heavy code to compensate for rain loss. Each uplink channel or subchannel is designated as either heavily coded or lightly coded.

The switch 102 performs decoding, ATM cell switching and encoding. The switch is designed to support many incoming and many outgoing ports, each operating at up to the maximum cell rate that can be maintained on the uplink and downlink respectively. Typically, a switch may have 64 incoming and 64 outgoing ports. The 64 ports are divided between 48 to support the uplink and downlink beams, 2 ports connected to each crosslink, 10 ports connected to multicast modules that provide cell duplication and 2 ports connected to the controller.

The controller 114 provides network specific signaling functions. This includes the establishment of virtual circuits through the ATM switch and network management functions.

A modulator 118 performs coding, modulation and signal shaping. The modulation takes the form of constant envelope modulation, such as QPSK or GMSK modulation. Mirroring the demodulator, the modulator supports two coding rates: heavy and light. Each downlink frame may be either heavily coded or lightly coded. Cells received from the switch are designated as either heavy or light and are placed in a downlink frame of the appropriate code type accordingly.

Uplink antenna 106 receives 48 spot beams across at least a portion of 1,000 MHz of spectrum in the 30 GHz band using a 1-in-4 frequency reuse pattern.

Uplink RF interface 108, comprises a bandpass filter to select a frequency band assigned to one of 48 beams. For each band, the uplink RF interface 108 provides a low noise amplifier and a down-converter.

Downlink RF interface 110 comprises an upconverter, traveling wave tube amplifier (TWTA), and waveguide each feeding one 125 MHz band.

Downlink Antenna 112 transmits 48 spot beams across 1,000 MHz of spectrum in the 20 GHz band, using a 1-in-4 frequency reuse pattern.

The Network Operations Center (NOC) 300 serves as the "switch manager" for the satellite payload's cell switch. The NOC 300 controls the establishment of each ATM virtual circuit through an exchange of signaling messages with the source and destination UETs.

In its switch manager role, the NOC 300 performs a variety of functions, including: call establishment signaling; cell switch configuration; call admission control; user authentication; user service authorization; address resolution; routing; connection statistics collection; network congestion control; and priority access control.

The components within the NOC appearing in FIG. 1 are summarized below:

Antenna 306 is functionally the same as UET's antenna 406 with the additional capability to transmit and receive TT&C signals. The Ka-band may be used for TT&C, or another band, requiring a different antenna, could be used. Typically, a NOC has a larger antenna 306 than the equivalent for a UET 400.

RF interface 304 is functionally the same as the UET's RF interface 404 with greater performance.

Network Interface Unit 314 is functionally the same as the UET's NIU 414, with greater performance.

Figure 2:
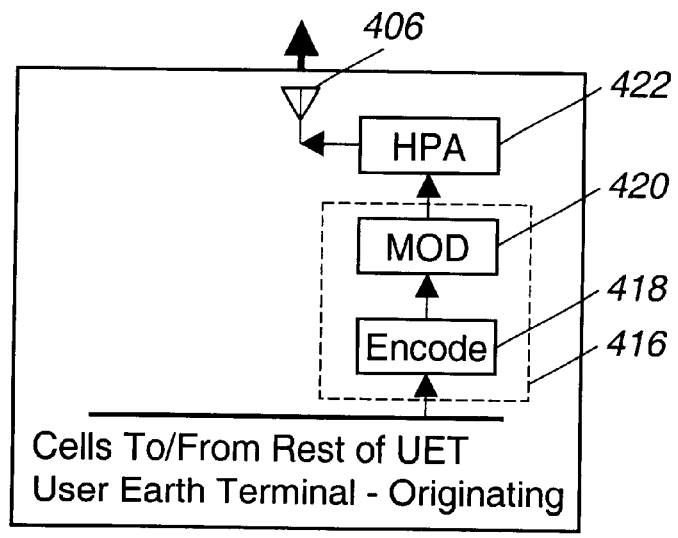
FIG. 2 is a schematic block diagram of the preferred form of uplink transmission subsystem shown in FIG. 1.

As shown in FIG. 2, RF interface 404 comprises an uplink baseband unit 416 including an encode circuit 418, a modulator 420 and a high power amplifier (HPA) 422. Unit 416 includes a frame former unit. During transmission of communication signals to satellite 100, HPA 422 is operated in a non-saturated mode of operation, preferably in a linear mode of operation. Operating HPA 422 in a linear region of its operating characteristics allow bandwidth efficient uplink transmission. This is reasonable since terminal 400 can access a terrestrial power grid or can received power from a battery of substantial capacity.

Figure 3:
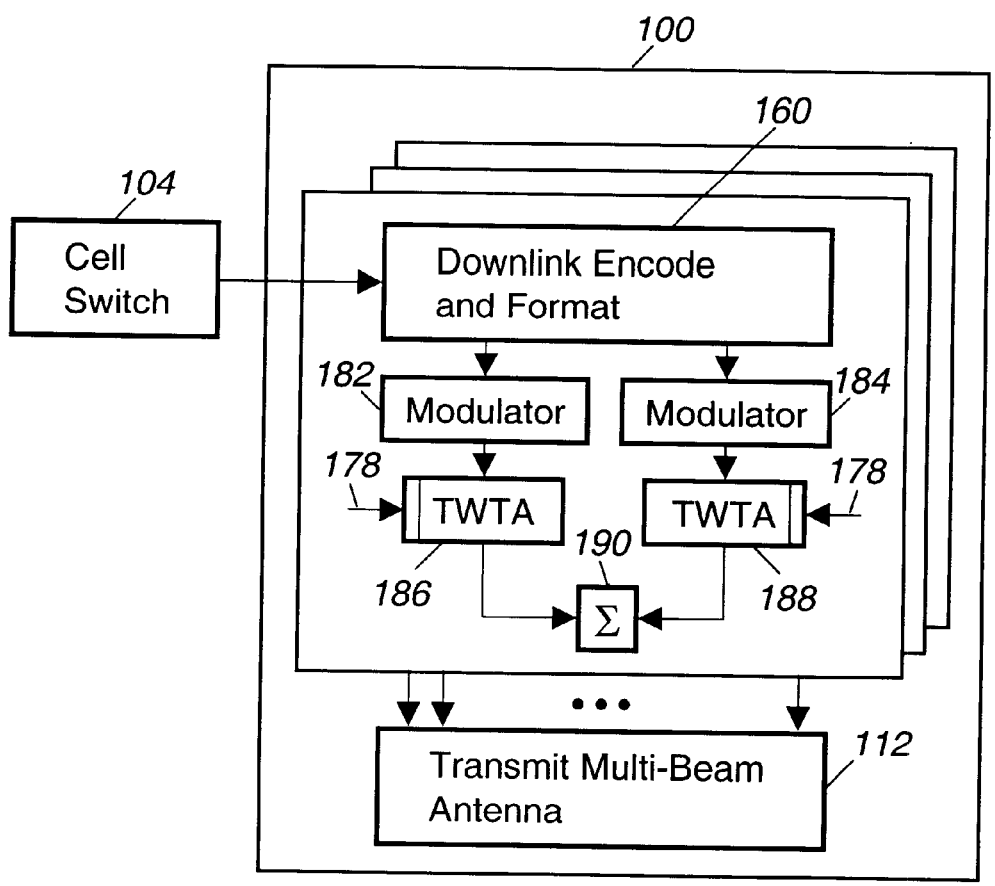
FIG. 3 is a schematic block diagram illustrating some of the satellite downlink circuitry shown in FIG. 1.

FIG. 3 is a block diagram of the satellite 100 downlink transmission components, including a downlink encode and format module 160 which generates downlink frames of data. Such modules are well known to those skilled in satellite communications. A total downlink frame is presented to the downlink modulator circuits 182 and 184 at a rate of 98.35 MHz (196.7 megachips/second) in an unbroken string from one downlink frame to the next.

The dibit stream produced by module 160 is passed to the downlink modulators 182 and 184 as a continuous stream clocked at 98.35 MHz, i.e. the basic downlink rate. As previously described, the modulators perform constant envelope modulation, such as QPSK or GMSK modulation. This modulated stream is entered into a pair of transversal filters which produce two shaping functions consisting of a set of 393.4 MHz samples which define the envelope of spectrally compact shaped symbols formed by raised cosine 25% shaping of staggered QPSK. These samples are converted to the analog realm by means of a pair of high speed digital to analog devices. After passage through zonal filters, the resultant waveforms constitute the modulation waveforms for the I and Q components of the downlink. These waveforms are passed to a balanced mixer circuit which is also fed by the local oscillator for the downlink IF.

The resultant downlink IF is then upconverted to a specific band in the 20 GHz range using one of 8 different mixing frequencies, depending on which downlink band is being created, to form the drive signal for the high power amplifiers of satellite 100.

The satellite 100 may have two types of high power amplifiers (HPA), lower power or higher power traveling wave tube amplifiers (TWTA) 186 and 188. Generally, the smaller amplifier is intended to serve earth terminals for large volume users: such terminals may be expected to have much larger antennas than those for the low volume, lower availability users.

The drive signals to the HPAs are calibrated to place the operating point of the TWTAs at a level which optimizes the performance of the downlink, including the demodulator of UET 400. The HPAs are operated in a saturated mode of operation during transmission of communication signals on the downlink to UET 400. Operating the HPAs in saturation (as is current practice) with constant envelope modulation, such as QPSK or GMSK, is a power efficient mode of operation which is important for the limited power available on the satellite. Typically, a satellite relies on batteries and solar arrays, etc. for power.

The outputs of the HPAs are passed by waveguide to the downlink feed associated with the particular beam to which the signals are destined. This feed illuminates a parabolic antenna 112 which reflects the signal into a narrow beam (about 0.4 arcdegrees from midbeam to edge of coverage) resulting in an effective gain of about 48.0 dB (60,000 times) and an EIRP, for the band served by the higher power TWTA, of nearly 61 dBW (or 1.25 megawatts). As a result of the spectral shaping performed during the modulation process, the transmitted spectrum of each 98.35 megasymbol/second downlink band has good roll-off and is predominantly contained within the 125 MHz.

The circularly polarized signals of the two bands in the beam propagate downwards, subject to spreading loss, absorption and rain fading.

Figure 4:
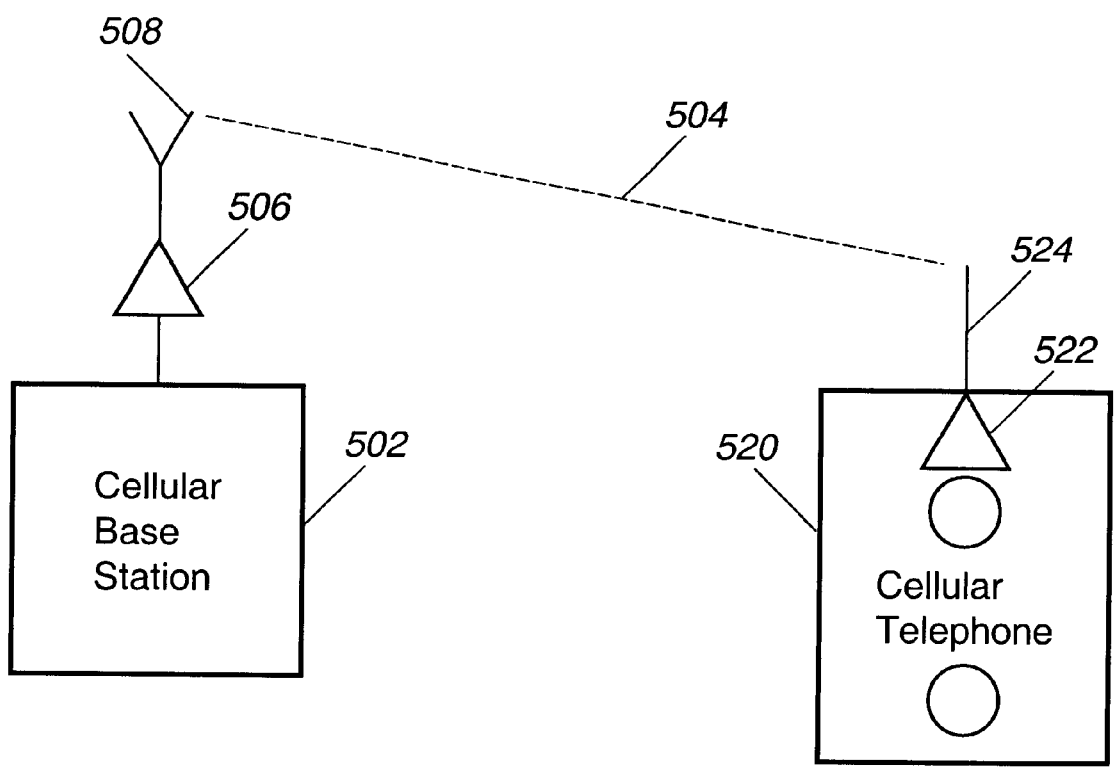
FIG. 4 is a schematic block diagram of a preferred form of cellular telephone communication link made in accordance with the present invention.

FIG. 4 is a schematic block diagram of the preferred cellular telephone communication system embodiment of the invention. A cellular receiver/transmitter base station 502 employs a communication link 504 to communicate with a cellular telephone 520. Base station 502 includes a power amplifier 506 which is operated in a non-saturated mode of operation, preferably a linear mode of operation in the linear portion of its operating characteristic. A send-receive antenna 508 transmits amplified cellular communication signals over link 504 to telephone 520 which includes a power amplifier 522 that is operated in a saturated mode of operation during transmission of cellular telephone signals over link 504 to base station 502. The signals are transmitted and received via antenna 524. Operating amplifier 506 in its non-saturated mode and amplifier 522 in its saturated mode has the same advantages previously described in connection with HPA 422 and HPAs 185 and 187.

Those skilled in the art will recognize that the preferred embodiments may be altered and modified without departing from the true spirit and scope of the invention as defined in the accompanying claims.

What is claimed is:

1. In a wireless communication system employing a communication link between a first transmitter/receiver and a second transmitter/receiver, the second transmitter/receiver having a power transmitting disadvantage with respect to the first transmitter receiver, apparatus comprising:

a first power amplifier in said first transmitter/receiver operated in a non-saturated mode of operation during transmission of communication signals to said second transmitter/receiver on said communication link;

a modulator in said second transmitter/receiver operating with constant envelope modulation; and a second power amplifier in said second transmitter/receiver operated in a saturated mode of operation during transmission of communication signals on said communication link to said first transmitter/receiver.

2. Apparatus, as claimed in claim 1, wherein said first power amplifier is operated in a non-saturated mode of operation comprises a linear mode of operation.

3. Apparatus, as claimed in claim 1, wherein said communication system comprises a satellite communication system and wherein said first transmitter/receiver comprises a satellite communication earth terminal.

4. Apparatus, as claimed in claim 3, wherein said second transmitter/receiver comprises a communication satellite.

5. Apparatus, as claimed in claim 4, wherein said earth terminal comprises a modulator using high order modulation.

6. Apparatus, as claimed in claim 1, wherein said communication system comprises a cellular communication system and wherein said first transmitter/receiver comprises a cellular base station.

7. Apparatus, as claimed in claim 7, wherein said second transmitter/receiver comprises a cellular telephone.

8. In a wireless communication system employing a communication link between a first transmitter/receiver comprising a first power amplifier and a second transmitter/receiver comprising a second power amplifier, the second transmitter/receiver having a power transmitting disadvantage with respect to the first transmitter receiver, said a method of transmitting over the communication link comprising:

generating first communication signals for transmission over said communication link from said first transmitter/receiver to said second transmitter/receiver;

operating said first power amplifier in a non-saturated mode of operation during transmission of said first communication signals to said second transmitter/receiver on said communication link;

generating second communication signals for transmission over said communication link from said second transmitter/receiver to said first transmitter/receiver;

modulating the second communication signals with constant envelope modulation; and operating said second power amplifier in a saturated mode of operation during transmission of said second communication signals on said communication link to said first transmitter/receiver.

9. A method, as claimed in claim 8, wherein said generating first communication signals comprises generating first satellite communication signals and wherein said operating said first power amplifier in a non-saturated mode of operation comprises operating said first power amplifier in a linear mode of operation.

10. A method, as claimed in claim 9, wherein said generating second communication signal comprises generating second satellite communication signals for transmission to earth.

11. A method, as claimed in claim 10, and further comprising modulating said first satellite communication signals with high order modulation.

12. A method, as claimed in claim 8, wherein said generating first communication signals comprises generating first cellular telephone communication signals for transmission to said second transmitter/receiver.

13. A method, as claimed in claim 12, wherein said generating second communication signals comprises generating cellular telephone communication signals for transmission to said first transmitter/receiver.

* * * * *